(12) United States Patent  
Murakami

(10) Patent No.: US 8,052,219 B2  
(45) Date of Patent: Nov. 8, 2011

(54) SEAT BELT RETRACTOR AND SEAT BELT DEVICE USING THE SAME

(75) Inventor: Yoshiki Murakami, Tokyo (JP)

(73) Assignee: Takata Corporation, Tokyo (JP)

( * ) Notice: Subject to any disclaimer, the term of this patent is extended or adjusted under 35 U.S.C. 154(b) by 138 days.

(21) Appl. No.: 12/588,426

(22) Filed: Oct. 15, 2009

(65) Prior Publication Data

US 2010/0123349 A1 May 20, 2010

(30) Foreign Application Priority Data

Nov. 20, 2008 (JP) ................................ 2008-296323

(51) Int. Cl.
*B60R 22/00* (2006.01)
*A62B 35/00* (2006.01)

(52) U.S. Cl. .......................... 297/475; 297/476; 297/479

(58) Field of Classification Search .................. 297/475, 297/476, 479

See application file for complete search history.

(56) References Cited

U.S. PATENT DOCUMENTS

| 4,293,105 A | * | 10/1981 | Weman | 297/475 X |
| 4,446,884 A | * | 5/1984 | Rader, Jr. | 137/355.23 |
| 4,722,495 A | | 2/1988 | Meredith | |
| 4,771,854 A | * | 9/1988 | Syrowik | 180/268 |
| 4,940,193 A | * | 7/1990 | Grabowski | 297/475 X |
| 4,989,804 A | * | 2/1991 | Ebner et al. | 242/372 |
| 5,794,878 A | * | 8/1998 | Carpenter et al. | 242/381 |

FOREIGN PATENT DOCUMENTS

| JP | S61-160338 A | 7/1986 |
| JP | H07-144606 | 6/1995 |
| JP | H09-058410 | 3/1997 |
| JP | H09-323618 | 12/1997 |
| JP | H10-129417 | 5/1998 |
| JP | 2004-106561 | 4/2004 |
| JP | 3787001 | 3/2006 |
| JP | 2006-182326 | 7/2006 |
| JP | 2008-049939 | 3/2008 |

* cited by examiner

*Primary Examiner* — Rodney B White
(74) *Attorney, Agent, or Firm* — Manabu Kanesaka

(57) ABSTRACT

A seat belt retractor for retracting a seat belt includes a spool for retracting the seat belt, a locking mechanism for locking rotation of said spool, and an end-lock preventing mechanism for preventing an end-lock of the seat belt. The end-lock preventing mechanism includes a first speed-reduction portion for largely reducing a seat belt retracting speed of the spool when the spool retracts a substantially full length of the seat belt, and a second speed-reduction portion for reducing the seat belt retracting speed less than that of the first speed-reduction portion so as to provide a delay for the locking mechanism to be brought to a non-lock position at least when retraction of the seat belt is finished.

12 Claims, 12 Drawing Sheets

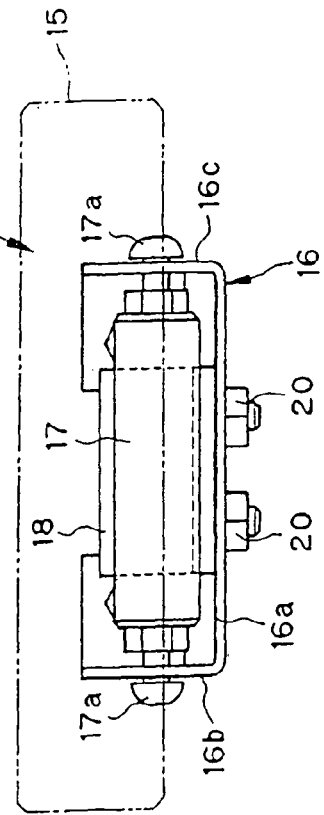
Fig. 5B
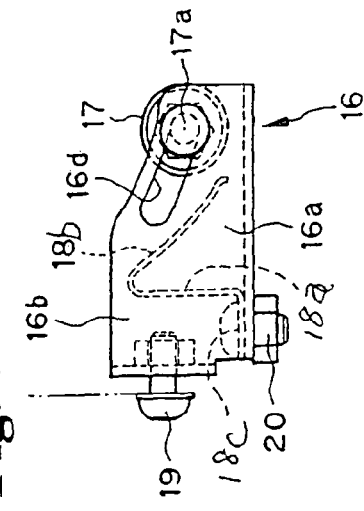
Fig. 5D
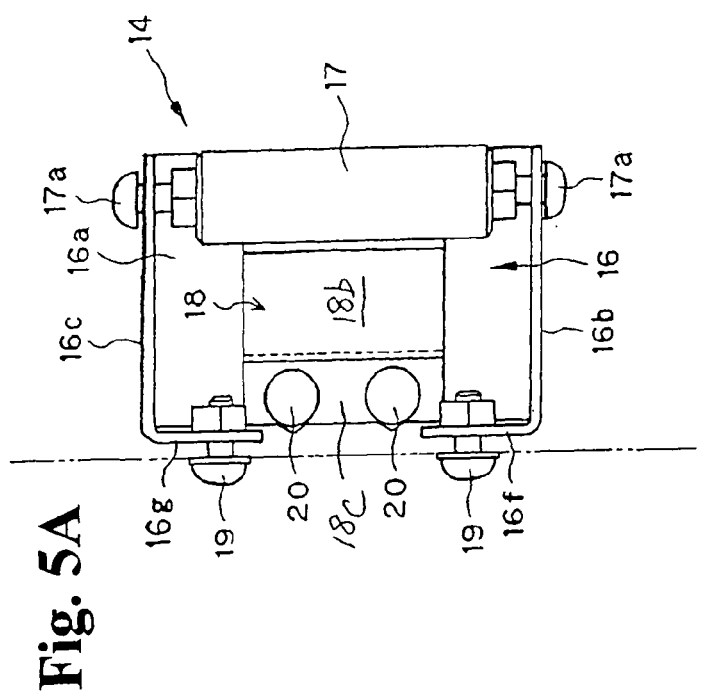
Fig. 5A
Fig. 5C

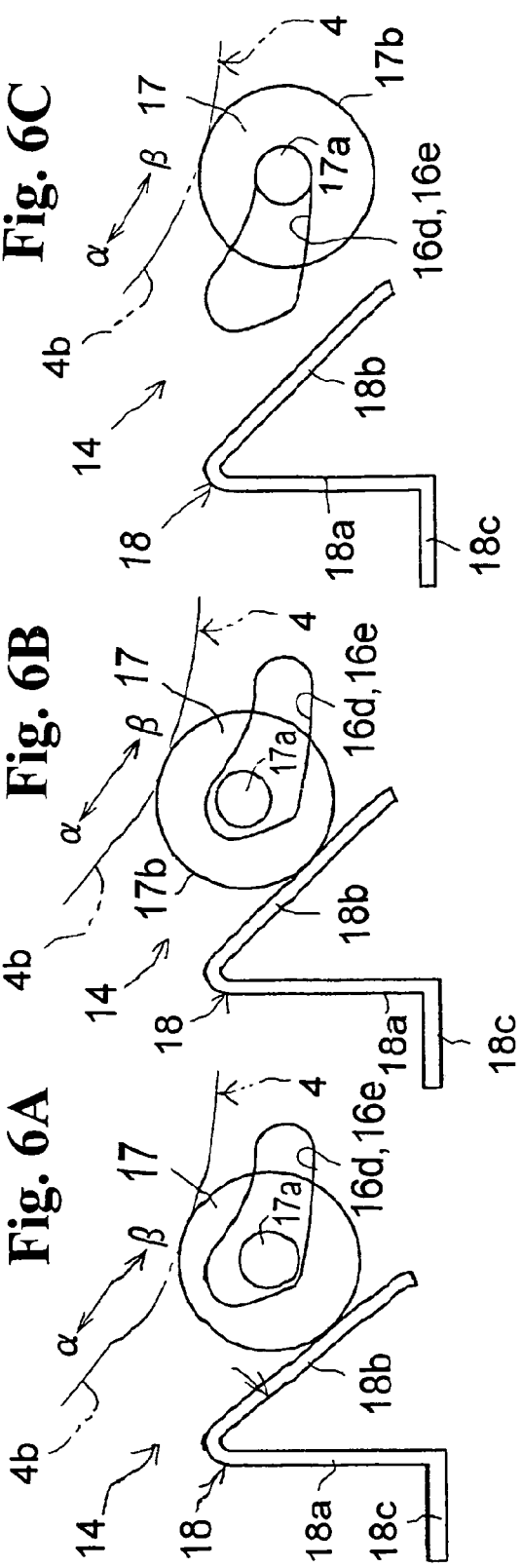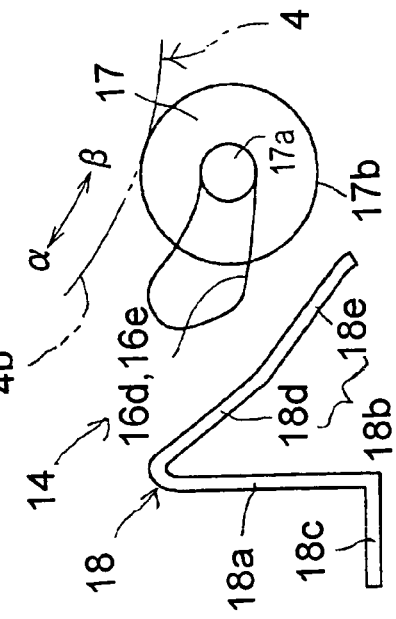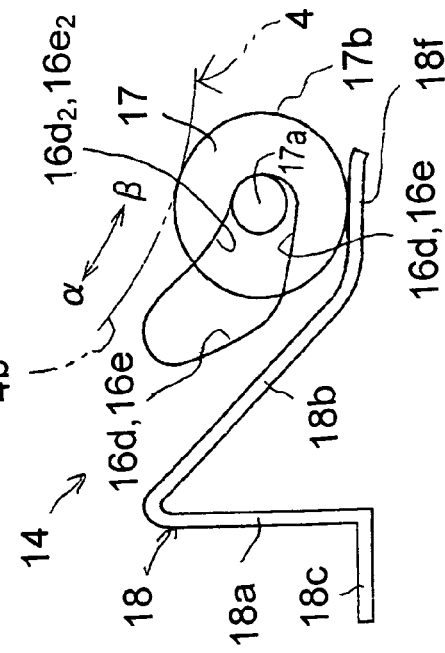

SEAT BELT RETRACTOR AND SEAT BELT DEVICE USING THE SAME

BACKGROUND OF THE INVENTION AND RELATED ART STATEMENT

The present invention relates to a seat belt retractor used for a seat belt device equipped in a vehicle such as an automobile and a gear mechanism for transmitting rotation of a spool for retracting a seat belt to other members or for transmitting rotation of other members to the spool and a seat belt device having the same.

A seat belt device attached to a vehicle seat of an automobile or the like has been provided with a seat belt retractor. The seat belt retractor locks rotation in a belt withdrawing direction of a spool for retracting a seat belt by means of an operation of a lock gear of a locking mechanism in case of emergency where a large deceleration acts on a vehicle at a collision or the like, for example.

The spool is urged by spring means in a seat belt retracting direction all the time. Thus, if an occupant disengages a tongue from a buckle when releasing the seat belt, the seat belt having been withdrawn is retracted by the spool by an urging force of the spring means relatively rapidly. When a full length of the seat belt is retracted by the spool and rotation of the spool and stopped, an inertia body supported by the lock gear so as to be capable of swing is operated by its inertia and moved to a lock position. Then, an end lock might occur, thereby preventing the rotation of the spool in the seat belt withdrawing direction by the operation of the inertia body. As a result, the seat belt cannot be withdrawn any more.

The inertia body of the locking mechanism rotates to the lock position during rapid withdrawal faster than a normal withdrawing speed of the seat belt and locks the rotation of the spool in the seat belt withdrawing direction. Also, the inertia body brought to the lock position returns to a non-lock position by a self restoring force or rotation of the spool in the seat belt retracting direction or the like.

In view of this problem, a seat belt retractor has been proposed, wherein the seat belt comprises an end-lock preventing mechanism for preventing occurrence of end lock by preventing rotation of the inertia body to the lock position by a stopper member when the full amount of the seat belt has been retracted by the spool and by controlling the stopper member by a cam operated according to a rotation amount of the spool in the seat belt retracting direction of the spool (See Japanese Unexamined Patent Application Publication No. 9-58410: Patent Document 1, for example).

Also, a seat belt device having an end-lock preventing mechanism for preventing the occurrence of end lock by another method is proposed (See Japanese Unexamined Patent Application Publication No. 2004-106561: Patent Document 2, for example). With the end-lock preventing mechanism of the seat belt device disclosed in Patent Document 2, the seat belt withdrawn from the seat belt retractor is wound around a movable pulley, and the seat belt is urged all the time by a spring through the movable pulley. By reducing a retracting speed of the seat belt by continuously reducing a bending angle of the seat belt by the movable pulley as a retracted amount of the seat belt by the spool becomes large, the occurrence of end lock is prevented.

However, in the end-lock preventing mechanism of the seat belt retractor described in Patent Document 1, it is still necessary to provide a cam operated according to a rotation amount in the seat belt retracting direction. Therefore, the number of components is large, which makes the structure complicated.

Also, in the end-lock preventing mechanism of the seat belt device described in Patent Document 2, it is still necessary to provide a movable pulley along a predetermined moving path at a position separated from the seat belt retractor. Thus, the number of assembling processes for assembling the seat belt device to a vehicle is large. Furthermore, relative positions of the seat belt retractor and the movable pulley should be positioned and assembled with high accuracy in order to obtain a certain stable deceleration of the seat belt retracting speed. Moreover, a space for ensuring movement of the movable pulley should be provided in a limited space of a vehicle body, and the structure is complicated. Thus, the seat belt retractor described in Patent Document 2 has a problem that assembling workability is not good.

Moreover, an urging force of the spring means for urging the spool is applied to the seat belt all the time, and at the same time, an urging force of the spring means for urging the movable pulley is also applied. Therefore, a large seat belt withdrawing force is required when an occupant operates to withdraw the seat belt. Therefore, handling performance by the occupant of the seat belt is not favorable. Furthermore, a sense of pressure on the occupant when the seat belt is worn is large. Particularly, since the seat belt is urged by the movable pulley in the seat belt withdrawing direction all the time, the urging force of the spring means urging the spool also needs to be large. Thus, the sense of pressure on the occupant when the seat belt is worn is further made large and adjustment of the sense of pressure on the occupant is difficult.

The present invention has been made in view of the above circumstances and has an object to provide a seat belt retractor which can simplify the structure, further facilitate assembling, improve handling performance of a seat belt by an occupant and more effectively prevent the end lock, and a seat belt device using the same.

Further objects and advantages of the invention will be apparent from the following description of the invention and the associated drawings.

SUMMARY OF THE INVENTION

In order to solve the above problems, a seat belt retractor according to the present invention comprises a spool for retracting a seat belt, a locking mechanism for locking rotation of the spool, and an end-lock preventing mechanism, wherein the end-lock preventing mechanism has a large speed-reduction portion for largely reducing a seat belt retracting speed of the spool when the seat belt retracted by the spool reaches the vicinity of a full amount or the vicinity of a substantially full amount of the seat belt, and a low speed portion for setting the seat belt retracting speed reduced by the large speed-reduction portion to a low speed for giving a delay in order for the locking mechanism to be brought to a non-lock position at least when retracting of the seat belt is finished.

Also, the seat belt retractor according to the present invention comprises a spool for retracting a seat belt, a locking mechanism for locking rotation of the spool, and an end-lock preventing mechanism, wherein the end-lock preventing mechanism has a braking member with which a surface of a seat belt wound around the spool is brought into contact directly or indirectly when the seat belt retracted by the spool reaches the vicinity of a full or substantially full amount of the seat belt. The braking member largely reduces a seat belt retracting speed of the spool, and allows the seat belt retracting of the spool at the largely-reduced seat belt retracting speed. Further, the braking member sets the largely reduced seat belt retracting speed to a low speed so as to give a delay for the locking mechanism to be brought to a non-lock position at least when the retracting of the seat belt is finished.

Moreover, in the seat belt retractor according to the present invention, the braking member has a large speed-reduction portion for largely reducing the seat belt retracting speed of the spool when the surface of the seat belt wound around the spool is brought into contact directly or indirectly in a wedge state and a low speed portion for setting the seat belt retracting speed reduced by the large speed-reduction portion to a low speed for giving a delay for the locking mechanism to be brought to the non-lock position at least when the retracting of the seat belt is finished. In the retraction of the seat belt, the retracting speed of the seat belt is largely reduced by the large speed-reduction portion and the spool retracts the seat belt at the low retracting speed of the seat belt by the low speed portion.

Moreover, the seat belt retractor according to the present invention is such that the low speed portion is a small speed-reduction portion for setting the seat belt retracting speed of the spool to a deceleration lower than that of the large speed-reduction portion, and the small speed-reduction portion reduces the seat belt retracting speed of the spool by a small amount.

Moreover, the seat belt retractor according to the present invention is such that the large speed-reduction portion and the low speed portion are formed by elastic plate materials.

Moreover, in the seat belt retractor according to the present invention, the braking member is provided with two arms connected to each other at a predetermined opened angle smaller than 180 degrees and that the large speed-reduction portion largely reduces the seat belt retracting speed when the surface of the seat belt wound around the spool is brought into contact with the two arms directly or indirectly in a wedge state.

The seat belt device according to the present invention comprises a seat belt worn by an occupant, a seat belt retractor according to the present invention for retracting the seat belt capable of withdrawal and operated to prevent the withdrawal of the seat belt in the emergency, a tongue slidably supported by the seat belt withdrawn from the seat belt retractor, and a buckle provided at a vehicle body or a vehicle seat and releasably engaging the tongue.

According to the seat belt retractor of the present invention configured as above, when the seat belt retracted by the spool reaches the vicinity of a full or substantially full amount of the seat belt, the large speed-reduction portion of the end-lock preventing mechanism largely reduces the seat belt retracting speed of the spool. Subsequently, the low speed portion of the end-lock preventing mechanism sets the seat belt retracting speed reduced by the large speed-reduction portion to a low speed for giving a delay for the locking mechanism to be brought to a non-lock position, which is not more than the speed reduced by the large speed-reduction portion and at least when the retracting of the seat belt is finished. As a result, when the seat belt retraction reaches the vicinity of a full or substantially full amount of the seat belt, the seat belt retracting speed of the spool is largely reduced, and the seat belt is retracted at the low seat belt retracting speed largely reduced thereafter. Therefore, even if the locking mechanism is brought to a lock position once, when the retracting of the seat belt by the spool is finished, the locking mechanism can be brought to the non-lock position. As a result, occurrence of the end lock when the seat belt retracting by the spool is finished can be effectively prevented.

Also, according to the seat belt retractor of the present invention, when the seat belt retraction reaches the vicinity of a full or substantially full amount of the seat belt, the surface of the seat belt wound around the spool is brought into contact with the braking member of the end-lock preventing mechanism directly or indirectly in a wedge state. As a result, the seat belt retracting speed of the spool is largely reduced. Particularly, when the surface of the seat belt wound around the spool is brought into contact with the braking member directly or indirectly in a wedge state, the seat belt retracting speed of the spool is reduced more effectively. Subsequently, since the braking member allows the seat belt retraction of the spool at the largely reduced seat belt retracting speed, the seat belt is retracted at a low speed, and when the retraction of the seat belt is finished, the locking mechanism can be brought to a non-lock position. Therefore, occurrence of the end lock when the seat belt retracting by the spool is finished can be effectively prevented.

Also, since the braking member of the end-lock preventing mechanism is integrally provided in the seat belt retractor, the braking member can be accurately positioned relative to the surface of the seat belt wound around the spool. Therefore, stable deceleration of the seat belt retracting speed can be obtained, and the end lock can be prevented more effectively when the seat belt retracting by the spool is finished.

Moreover, the large speed-reduction portion for largely reducing the seat belt retracting speed of the spool when the surface of the seat belt wound around the spool is brought into contact with the braking member directly or indirectly in a wedge state, and a low speed portion for setting the seat belt retracting speed reduced by the large speed-reduction portion to a low speed for giving a delay for the locking mechanism to be brought to a non-lock position at least when the seat belt retracting is finished are provided.

As a result, when a seat belt winding diameter of the spool reaches a predetermined winding diameter in the vicinity of a full or substantially full amount of the seat belt, firstly, the surface of the seat belt wound around the spool is brought into the large speed-reduction portion of the braking member directly or indirectly in a wedge state. Therefore, the seat belt retracting speed of the spool can be largely reduced by the large speed-reduction portion. Subsequently, the seat belt retracting speed of the spool is set by the low speed portion to a speed when the seat belt retracting speed of the spool is reduced by the large speed-reduction portion or less. Then, at the low seat retracting speed by the low speed portion, the locking mechanism having been brought to the lock position in large speed reduction is brought to the non-lock position when the seat belt retracting by the spool is finished. Thus, by largely reducing the seat belt retracting speed by the large speed-reduction portion, even if the inertia body of the locking mechanism is moved (rotated) to the lock position once, when the seat belt retracting by the spool is finished, the locking mechanism is returned to the non-lock position again by the low speed portion, and the occurrence of the end lock when rotation of the spool is stopped when the seat belt retracting is finished can be effectively prevented.

Particularly, after the seat belt retracting speed is largely reduced by the large speed-reduction portion, in the seat belt retracting of the spool at the low seat belt retracting speed by the low speed portion, rotation in the seat belt retracting direction of the spool can be stopped more smoothly, and the end lock can be stably prevented by retracting the seat belt while the seat belt retracting speed is reduced by a small amount.

Moreover, by forming the braking member of the end-lock preventing mechanism by an elastic plate material, after the spool rotation speed is largely reduced, the spool rotation speed can be smoothly lowered and at least when the seat belt retracting is finished, the locking mechanism can be brought to the non-lock position. In this way, while increase in the number of components is suppressed and the structure of the end-lock preventing mechanism is simplified, the end lock can be prevented from occurring.

Moreover, by the large reduction of the seat belt retracting speed by a wedge effect of the end-lock preventing mechanism, the seat belt retracting speed can be largely reduced more effectively. Moreover, when withdrawal of the seat belt for wearing the seat belt is started, the spool is rotated in a direction to release the wedge effect of the end-lock preventing mechanism, and a large seat belt withdrawing force is not required for the seat belt withdrawal by an occupant, and seat belt handling performance by the occupant is made favorable. Moreover, when the seat belt is withdrawn by a predetermined amount, the end-lock preventing mechanism no longer acts on the seat belt, the seat belt withdrawing force can be made further smaller, and the handling performance of the seat belt by the occupant is made more favorable.

Moreover, when the seat belt is worn, the end-lock preventing mechanism does not act on the seat belt, and the sense of pressure of the seat belt by the end-lock preventing mechanism to the occupant can be prevented. As described above, according to the seat belt retractor of this embodiment, while the structure is further simplified, assembling is further facilitated, and handling performance of the seat belt by the occupant is improved, a seat belt retractor which can prevent the end lock more effectively can be realized.

Regarding the seat belt device according to the present invention, since an assembling work of the end-lock preventing mechanism is no longer needed when the seat belt device is assembled to a vehicle, the number of assembling processes of the seat belt device can be reduced, and an assembling work of the seat belt device to the vehicle is simplified. Also, since the end lock in the seat belt retractor can be prevented more effectively and handling performance of the seat belt by the occupant can be improved, operability of the seat belt is improved and the wearing operation of the seat belt by the occupant can be performed smoothly and stably.

BRIEF DESCRIPTION OF THE DRAWINGS

FIGS. 5A to 5C show an end-lock preventing mechanism in the first embodiment, in which FIG. 5A is a perspective view, FIG. 5B is a front view, FIG. 5C is a plan view, and FIG. 5D is a left side view.

FIGS. 6A to 6C are diagrams for explaining a configuration and an operation of the end-lock preventing mechanism of the first embodiment, and FIGS. 6D and 6E are diagrams illustrating variations of the end-lock preventing member in the first embodiment.

DETAILED DESCRIPTION OF THE PREFERRED EMBODIMENTS

Preferred embodiments of the present invention will be described below using the attached drawings.

Figure 1:
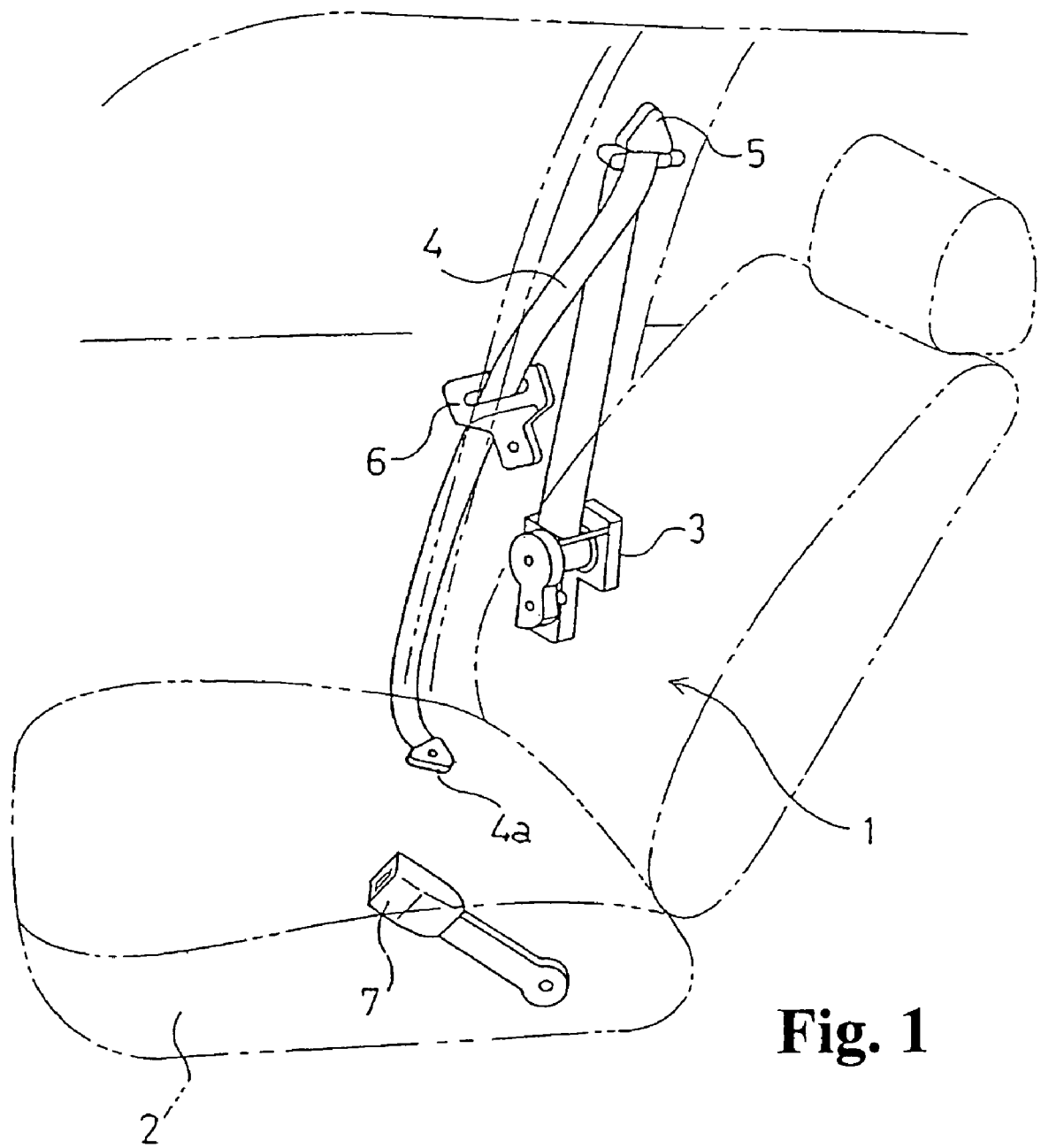
FIG. 1 is a diagram schematically illustrating a seat belt device provided with a first embodiment of a seat belt retractor according to the present invention.

FIG. 1 is a diagram schematically illustrating a seat belt device provided with a first embodiment of a seat belt retractor according to the present invention.

As shown in FIG. 1, a seat belt device 1 of this first embodiment, similarly to a known three-point seat belt device using a seat belt retractor, comprises a seat belt retractor 3 fixed to a vehicle body in the vicinity of a vehicle seat 2, a seat belt 4 withdrawn from the seat belt retractor 3 and having a belt anchor 4a at a distal end thereof fixed to a floor of the vehicle body or the vehicle seat 2, a guide anchor 5 for guiding the seat belt 4 withdrawn from the seat belt retractor 3 toward a shoulder of an occupant, a tongue 6 slidably supported by the seat belt 4 guided by the guide anchor 5, and a buckle 7 fixed to the floor of the vehicle body or the vehicle seat 2 and to which the tongue 6 is inserted and detachably engaged. The seat belt retractor 3 in the first embodiment will be explained.

Figure 2:
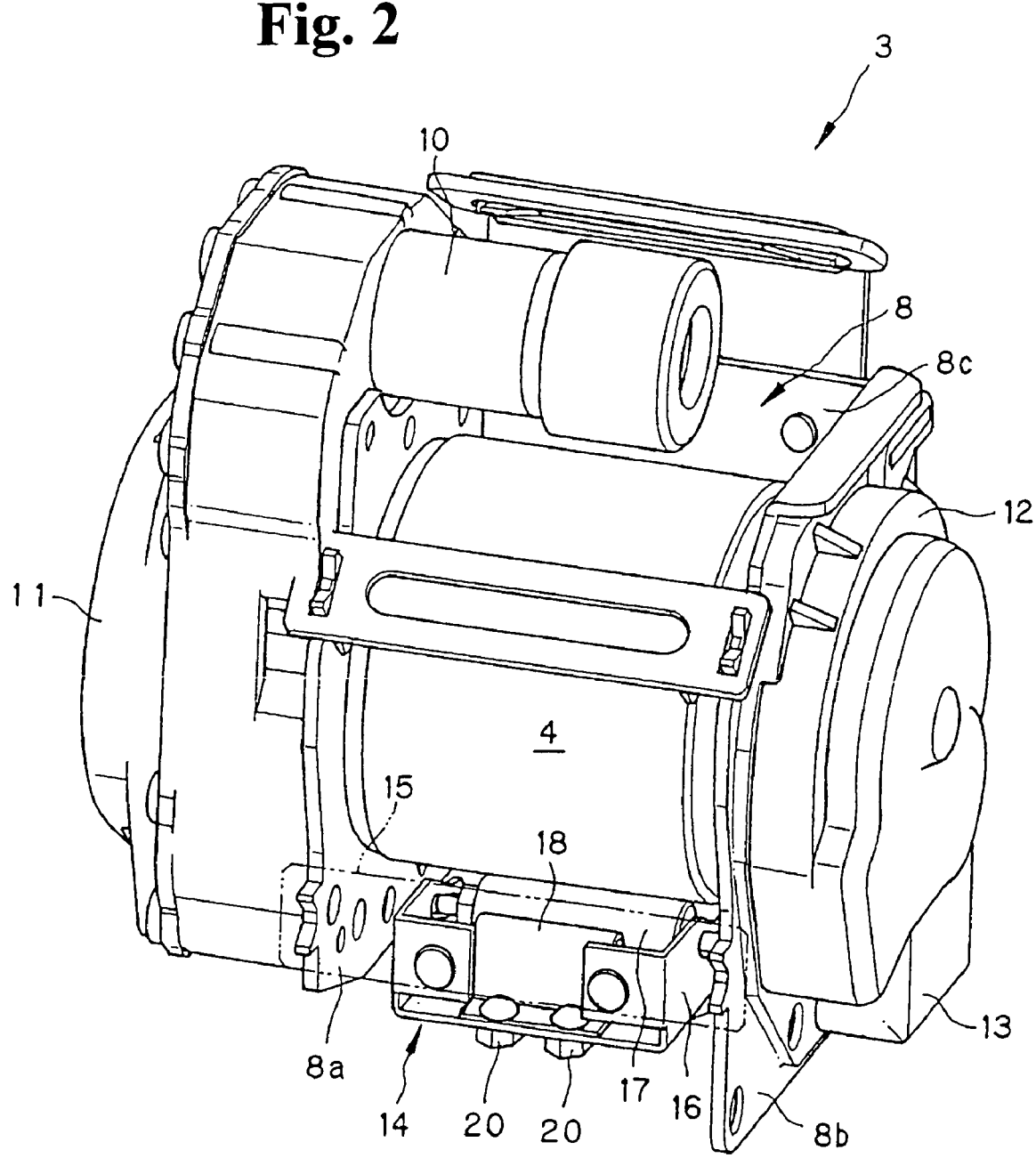
FIG. 2 is a perspective view of the seat belt retractor of the first embodiment.
Figure 3:
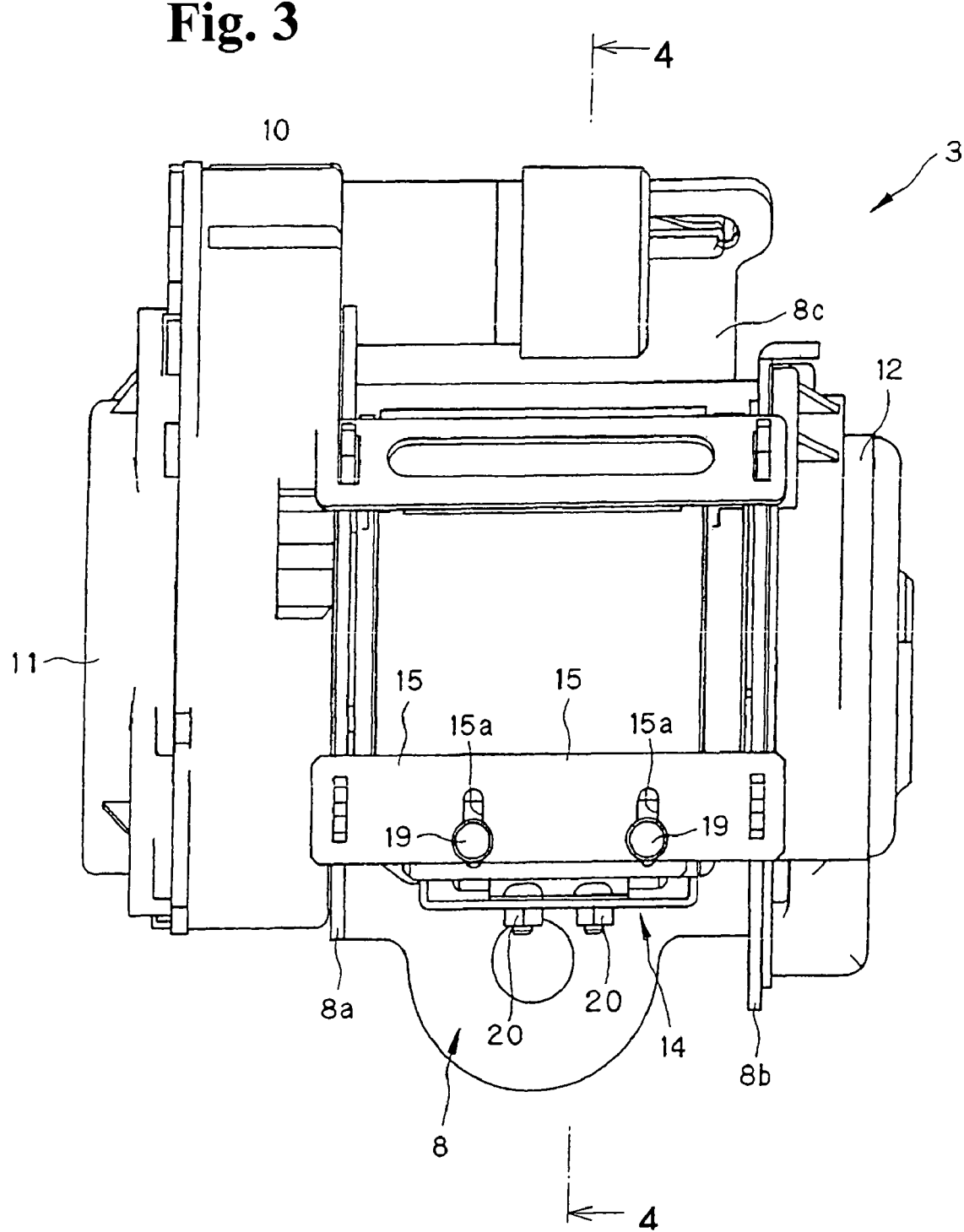
FIG. 3 is a front view of the seat belt retractor of the first embodiment.
Figure 4:
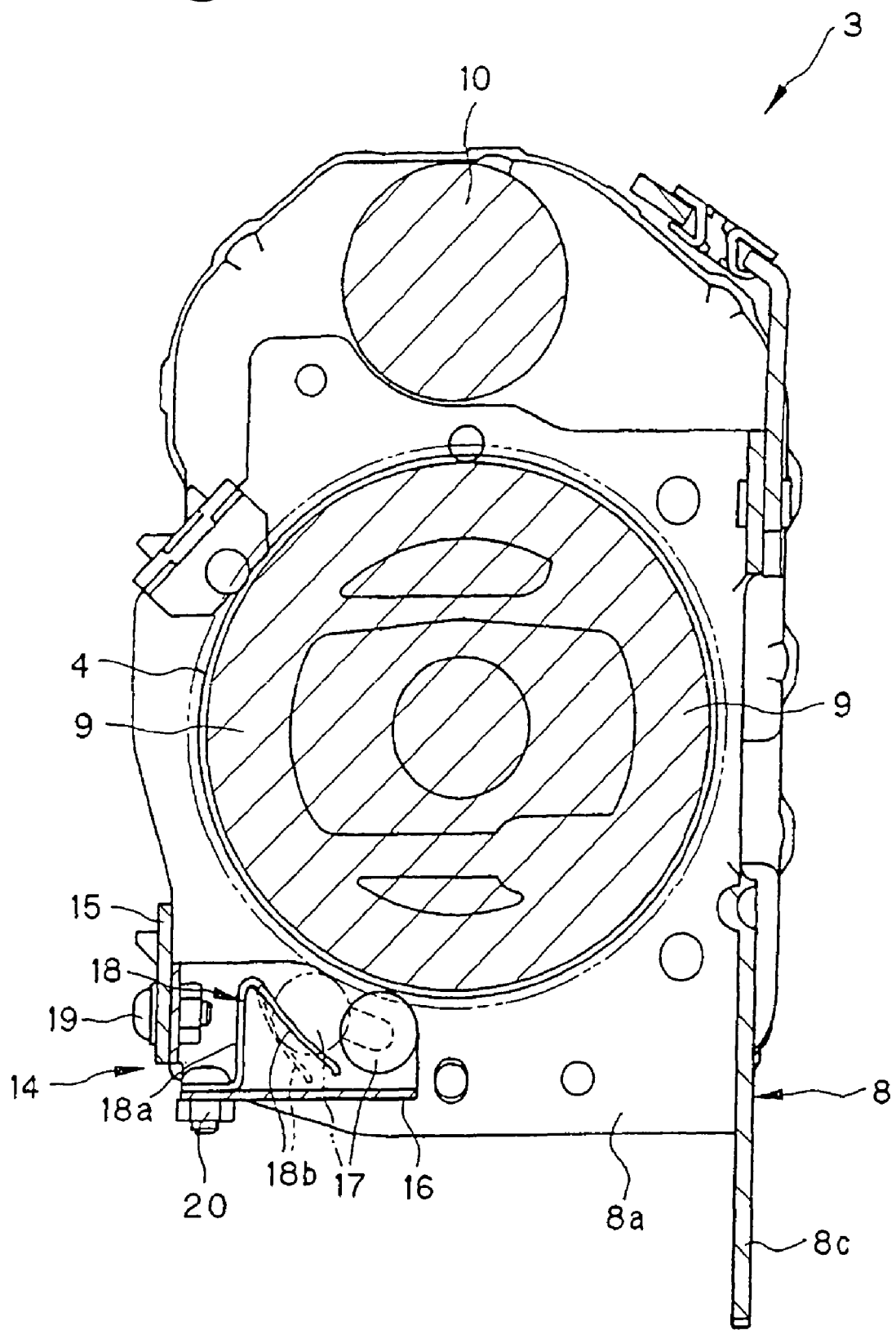
FIG. 4 is a sectional view taken along line 4-4 in FIG. 3.

FIG. 2 is a perspective view of the seat belt retractor of the first embodiment, FIG. 3 is a front view of the seat belt retractor of the first embodiment, and FIG. 4 is a sectional view along 4-4 line in FIG. 3.

As shown in FIGS. 2 to 4, the seat belt retractor 3 in the first embodiment basically has the same configuration as a prior-art emergency locking seat belt retractor (ELR) provided with a pre-tensioner. That is, similar to the prior-art ELR, the seat belt retractor 3 is provided with a U-shaped frame 8, a spool 9 for retracting the seat belt 4, a pre-tensioner 10 mounted on one side wall 9a of the frame 8, a spring mechanism 11 mounted on the one side wall 8a of the frame 8 for urging the spool 9 in a seat belt retracting direction all the time, a locking mechanism 12 mounted on the other side wall 8b of the frame 8 and operated in the emergency or in sudden withdrawal of the seat belt 4 at a withdrawing speed faster than a normal withdrawing speed for preventing rotation of the spool 9 in a seat belt withdrawing direction, and each constituent element of a deceleration sensing mechanism 13 mounted on the other side wall 8b of the frame 8 for sensing a vehicle deceleration in the emergency and operating the locking mechanism 12. Since these constituent elements have been known, detailed explanation regarding their structures and operation will be omitted (For the details, see Patent Document 1, Japanese Unexamined Patent Application Publication No. 9-323618: Patent Document 3, Japanese Unexamined Patent Application Publication No. 7-144606: Patent Document 4 and the like).

Also, the seat belt retractor 3 of the first embodiment is provided with an end-lock preventing mechanism 14 provided at the center between both side walls 8a and 8b on a connection portion 8c for connecting the both side walls 8a, 8b of the frame 8. As shown in FIGS. 5A to 5D, the end-lock preventing mechanism 14 has a support plate 15 detachably mounted on the connection portion 8c of the frame 8, an end-lock preventing frame 16 detachably mounted on the support plate 15, a braking roller 17 provided rotatably and capable of axial movement on the end-lock preventing frame 16, and a braking member 18 mounted on the end-lock preventing frame 16 and made of an elastic plate material such as an elastic plate spring or the like.

The end-lock preventing frame 16 has a center portion 16a and right and left side walls 16b, 16c installed upward from right and left end edges of the center portion 16a. In the right and left side walls 16b, 16c, guide holes 16d, 16e curved in the same direction and having the same size are drilled. Into the guide holes 16d, 16e, a rotation shaft 17a of the braking roller 17 is inserted rotatably and movably along the guide holes 16d, 16e. That is, the braking roller 17 is guided rotatably by the both side walls 16b, 16c of the end-lock preventing frame 16 and by the guide holes 16d and 16e capable of axial movement.

Also, one end sides of the right and left side walls 16b, 16c are bent inward substantially orthogonally, and bent portions 16f, 16g are detachably mounted on the support plate 15 by a bolt/nut 19, respectively. In this case, in the support plate 15, a pair of vertical position adjustment long hole 15a is drilled, and the bolt/nuts 19 penetrates the position adjustment long holes 15a capable of vertical movement. Therefore, positions of the end-lock preventing frame 16 and the braking roller 17 can be adjusted in the vertical direction with respect to the frame 8.

The braking roller 17 in the first embodiment is a roller made of a friction material such as a rubber roller and configured so that a surface of the seat belt 4 retracted by the spool by a predetermined amount is brought into contact with an outer peripheral face thereof. The braking roller 17 is not limited to the friction material but may be constructed by any roller material as long as the braking roller can be constructed.

The braking member 18 is detachably mounted on the center portion 16a of the end-lock preventing frame 16. As shown in FIGS. 6A to 6C, the braking member 18 is formed by a vertical portion 18a and an inclined portion 18b to have a section in a direction orthogonal to the right and left width direction bent substantially in the V-shape. A lower end portion of the vertical portion 18a is bent substantially at a right angle to become a mounting portion 18c. The mounting portion 18c is detachably mounted on the center portion 16a of the end-lock preventing frame 16 with the bolt/nut 20.

The braking roller 17 can be brought into contact with the inclined portion 18b. In this case, an interval between a surface 4b of the seat belt 4 retracted by the spool 9 and the inclined portion 18b is set as a V-shaped wedge state interval so as to become smaller toward a seat belt retracting direction α and larger toward a seat belt withdrawing direction β. The inclined portion 18b is elastically deformed so as to rotate and bend around a boundary portion between the vertical portion 18a and the inclined portion 18b when being pressed by the surface 4b of the seat belt 4 retracted by the spool 9 through the braking roller 17.

The braking member 18 constitutes a large speed-reduction portion for largely reducing the seat belt retracting speed as will be described later and a small speed-reduction portion for setting the seat belt retracting speed reduced by the large speed-reduction portion at a low speed lower than the speed reduced by the large speed-reduction portion and for giving a delay for an inertia body of the locking mechanism 12 to be brought to a non-lock position at least when retraction of the seat belt is finished.

The large speed-reduction portion of the braking member 18 largely reduces the seat belt retracting speed when the braking roller 17 is elastically brought into contact with the inclined portion 18b after the seat belt retracting by the spool 9 reaches the vicinity of full or substantially full amount retracting of the seat belt 4. Also, the small speed-reduction portion of the braking member 18 reduces the seat belt retracting speed by a small amount to a low speed lower than the speed largely reduced by the large speed-reduction portion so as to give a delay for the inertial body of the locking mechanism to be brought to the non-lock position at least when the retracting of the seat belt 4 is finished by means of increase of the seat belt retracting diameter after large speed reduction by the large speed-reduction portion and elastic deformation of the inclined portion 18b as mentioned above.

Therefore, the seat belt retracting speed by the spool 9 is largely reduced when the braking roller 17 is brought into contact with the inclined portion 18b after the seat belt retracting reaches the vicinity of full or substantially full-amount retracting of the seat belt 4 and then reduced by a small amount by means of elastic deformation of the inclined portion 18 by the braking roller 17. Then, at the full or substantially full-amount retracting of the seat belt, rotation of the spool 9 is stopped in a state in which the seat belt retracting speed has been lowered.

Since the other configurations of the seat belt retractor 3 of the first embodiment are substantially the same as the configuration of the seat belt retractor described in Patent Document 1, the explanation will be omitted.

An operation of the end-lock preventing mechanism 14 in the seat belt retractor 3 in the first embodiment configured as above will be described.

As shown in FIG. 6A, in a state in which the seat belt 4 has been retracted by a full amount (an amount retracted by the spring mechanism 11 when the seat belt 4 is not worn), the braking roller 17 has its outer peripheral face 17b brought into contact with the inclined portion 18b of the braking member 18 and kept in a state in contact with the surface 4b of the seat belt 4 retracted by the spool 9. At this time, an elastic force of the braking member 18 is applied to the braking roller 17. If an occupant withdraws the seat belt 4 for wearing the seat belt or the like from this state, the spool 9 and the seat belt 4 are rotated in the seat belt withdrawing direction β, and the seat belt 4 is withdrawn from the seat belt retractor 3. By means of the withdrawal of the seat belt 4, the spool winding diameter of the seat belt 4 is getting smaller.

By means of rotation of the spool 9 and the seat belt 4 in the seat belt withdrawing direction β, the braking roller 17 is rotated in a direction opposite to that of the spool 9 and the seat belt 4 while being guided by the guide holes 16d, 16e and moved in the seat belt withdrawing direction β. Since this movement of the braking roller 17 is made in a direction to release the V-shaped wedge effect, the braking roller 17 is moved relatively easily. Therefore, the withdrawal of the seat belt 4 by the occupant is performed relatively easily, and the occupant does not have a sense of discomfort.

When the seat belt 4 is further withdrawn, the braking roller 17 is further moved in the same direction and as shown in FIG. 6C, the braking roller 17 is separated from the inclined portion 18b of the braking member 18 and then, the rotating shaft 17a of the braking roller 17 is brought into contact with ends of the guide holes 16d, 16e and the axial movement of the braking roller 17 is stopped. At this time, the inclined portion 18b is elastically restored to a free state. Also, at this time, the surface 4b of the seat belt 4 retracted by the spool 9 is in contact with the braking roller 17. When the seat belt 4 is further withdrawn, the spool winding diameter of the seat belt 4 is made small, and the surface 4b of the seat belt 4 is separated from the braking roller 17 (not shown). After that, the seat belt 4 is not subjected to influence of the braking roller 17 and withdrawn more smoothly.

Subsequently, by release of the seat belt, the spool 9 starts retracting rotation of the seat belt 4 by an urging force of the spring mechanism 11 and retracts the seat belt 4 at a normal and relatively fast seat belt retracting speed similarly to the known seat belt retractor 3 as shown by a solid line in FIG. 7. As a result, the seat belt retracting diameter of the seat belt 4 wound around the spool 9 gets gradually large. Then, as shown in FIG. 6C, the surface 4b of the seat belt 4 wound around the spool 9 is brought into contact with the braking roller 17.

Since the seat belt 4 is retracted more rapidly, the braking roller 17 is rotated by retracting rotation of the seat belt 4 and axially moved rapidly along the guide holes 16d, 16e. When the seat belt 4 has been wound to the vicinity of full or substantially full amount, the surface 17b of the braking roller 17 is brought into contact with the inclined portion 18b of the braking member 18 and then, the braking roller 17 is brought to a position shown in FIG. 6B all at once. That is, the braking roller 17 is brought into contact in a wedge state with the surface 4b of the seat belt 4 wound around the spool 9 and the inclined portion 18b, and the braking member 18 largely reduces the speed of the braking roller 17 by the large speed-reduction portion on the basis of the wedge effect of the surface 4b of the seat belt 4 and the inclined portion 18b. As a result, as shown in FIG. 7 by a solid line, the seat belt retracting speed is largely reduced (retracing with large speed reduction). Then, the inertia body slidably supported by the lock gear of the locking mechanism 12 is rotated backward (moved) to the lock position by the inertia due to the large speed reduction.

After that, with increase of the seat belt retracting diameter by the spool 9, the braking roller 17 elastically deforms (rotates and bends) the inclined portion 18b while the roller moves toward the distal end of the inclined portion 18b by a slight amount. By means of the small speed-reduction portion on the basis of the elastic deformation of the inclined portion 18b of the braking member 18, while the seat belt retracting speed is reduced by a small amount as shown by a solid line in FIG. 7, the spool 9 retracts the seat belt 4 at a relatively low seat belt retracting speed. The seat belt retracting speed by the small speed-reduction portion is set at a low speed lower than the speed largely reduced by the large speed-reduction portion so as to give a delay for the inertia body of the locking mechanism 12 to be brought to the non-lock position at least when the retracting of the seat belt 4 is finished (rotation delay period for the inertia body of the locking mechanism 12 to the non-lock position).

As described above, even if the inertia body of the locking mechanism 12 is moved to the lock position and the lock gear of the locking mechanism 12 is rotated in the seat belt withdrawing direction (backward rotation), the full or substantially full-amount retracting of the seat belt 4 has not been finished, and the spool 9 is further rotated in the seat belt retracting direction and the retracting of the seat belt 4 at a low seat belt retracting speed is continued. In this way, while the retracting of the seat belt 4 is continued, the seat belt retracting speed of the spool 9 has become considerably low and is brought into a state in which large deceleration does not occur in the seat belt retracting speed. Therefore, the inertia body of the locking mechanism 12 is returned to the non-lock position by the restoring force and the rotation of the lock gear of the locking mechanism 12 in the seat belt retracting direction, and the lock gear of the locking mechanism 12 is made rotatable (forward rotation) in the seat belt retracting direction.

Figure 8:
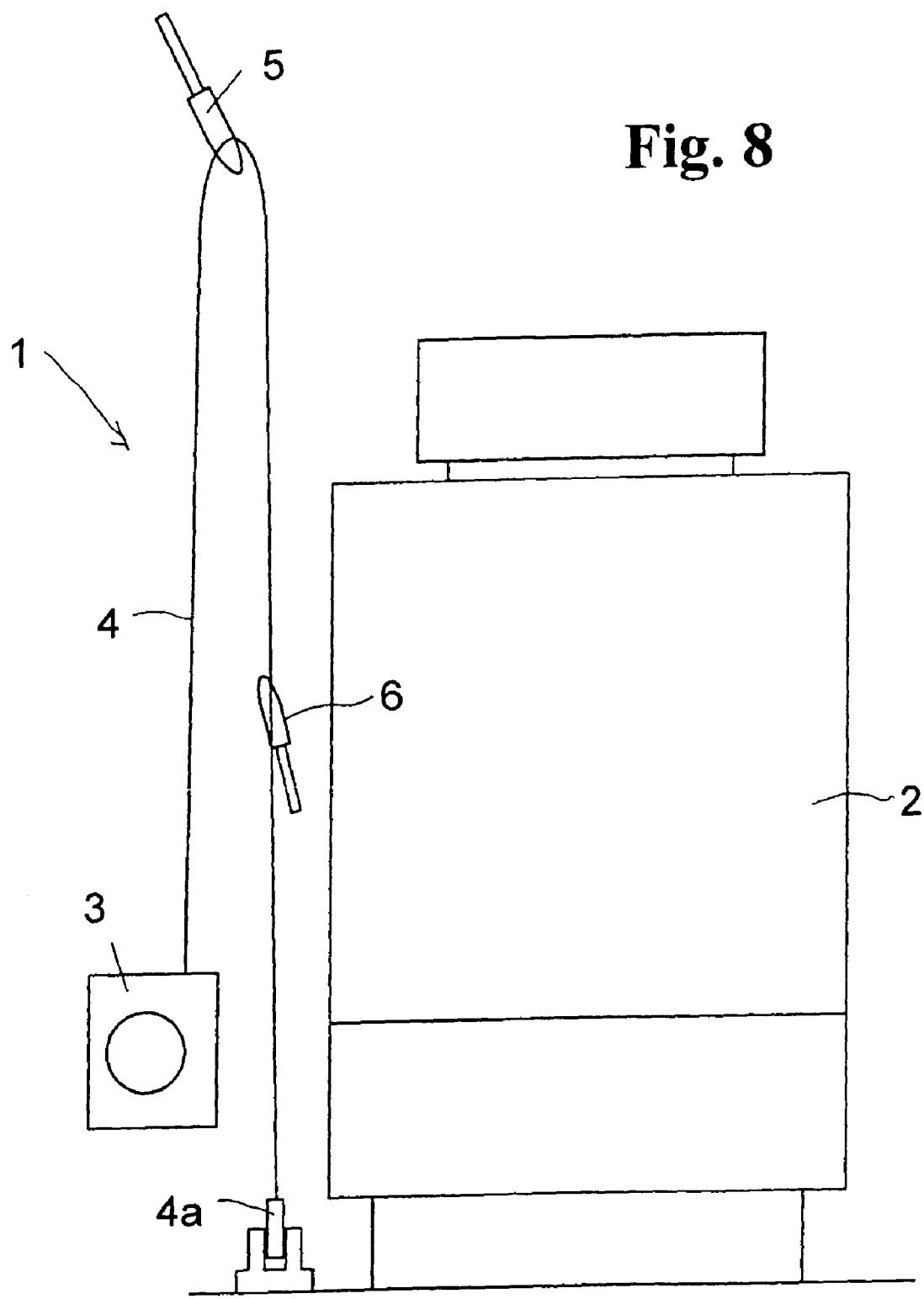
FIG. 8 is a diagram schematically illustrating a full-amount retracted state of a seat belt by a seat belt retractor.

Since the belt anchor 4a of the seat belt 4 is fixed to the floor of the car body as shown in FIG. 8, when the seat belt 4 has been retracted by the seat belt retractor 3 by its full or substantially full amount, the seat belt 4 is rarely loose. As a result, the retracting of the seat belt 4 by the seat belt retractor 3 is finished, and rotation of the spool 9 in the seat belt retracting direction is stopped. At this time, when the retracting of the seat belt 4 is finished and the rotation of the spool 9 in the seat belt retracting direction is stopped, the inertia body of the locking mechanism 12 has been already at the non-lock position as described above. As a result, occurrence of end lock when the retracting of the seat belt 4 is finished can be prevented.

Figure 7:
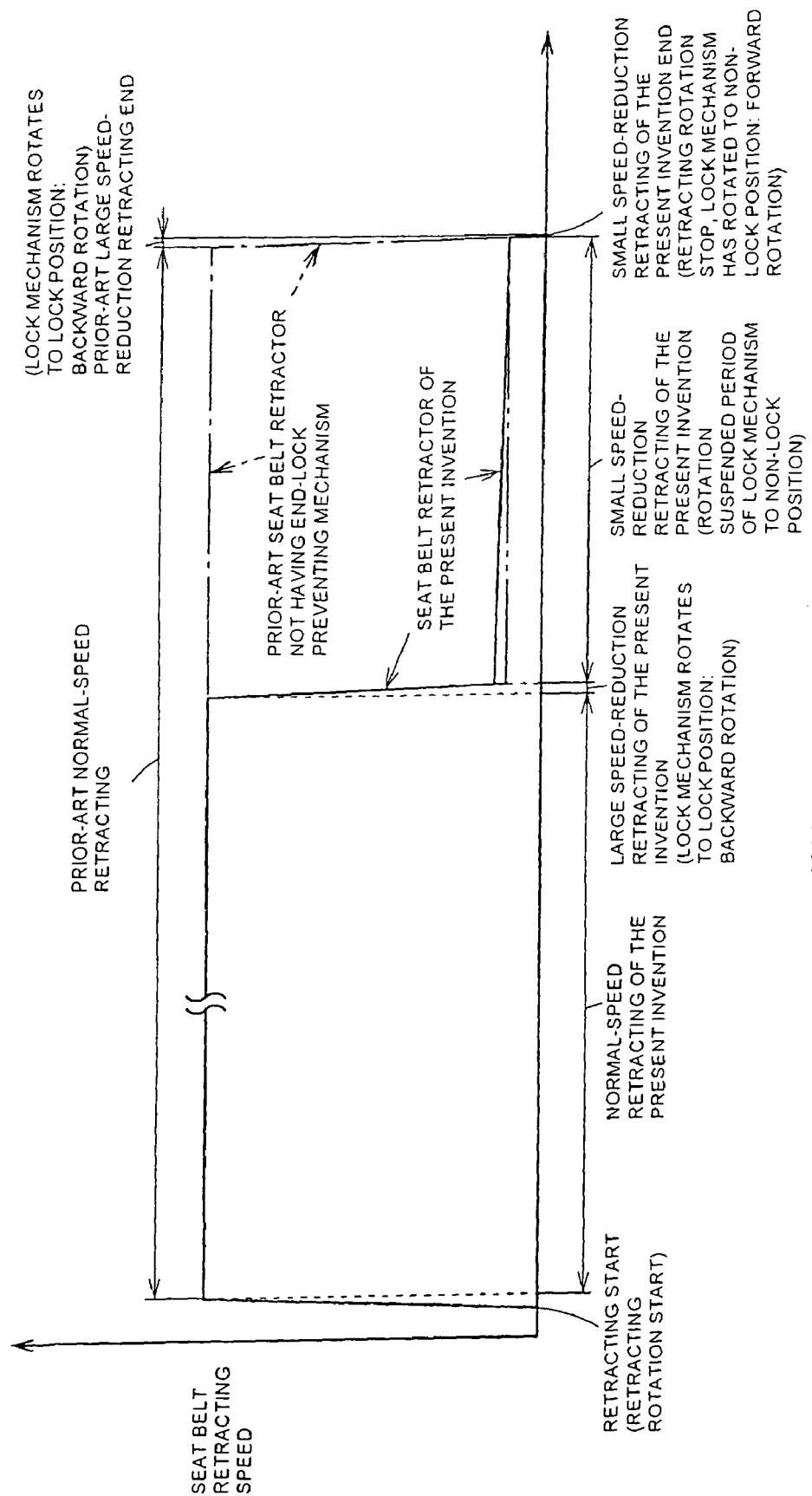
FIG. 7 is a diagram for explaining a principle of end lock prevention of the seat belt retractor of the present invention and a principle of occurrence of the end lock in a prior-art seat belt retractor.

In the conventional-type ELR which is not provided with the end-lock preventing mechanism, even if the seat belt 4 has been retracted to the vicinity of its full or substantially full amount, which is a point of time when large speed reduction of the present invention is started, the retracting of the seat belt 4 is continued still at a normal high seat belt retracting speed as shown by a one-dot chain line in FIG. 7. If the seat belt 4 has been retracted substantially by the full amount, the seat belt retracting speed is largely reduced (retracting with large speed reduction) as shown by the one dot chain line in FIG. 7. Thus, the inertia body of the locking mechanism 12 is moved to the lock position. Substantially at the same time as the large speed-reduction retracting, the seat belt 4 is brought to a fully-retracted state shown in FIG. 8, and the retracting of the seat belt 4 is finished. At this time, the inertia body of the locking mechanism 12 having moved to the lock position might not have been returned to the non-lock position yet, and there is a possibility that end lock has occurred.

The operations other than the end-lock preventing operation of the seat belt retractor 3 in the first embodiment are substantially the same as the operation of the seat belt retractor described in Patent Document 1, and the explanation will be omitted. Instead of the small speed-reduction retracting after the large speed reduction, the seat belt 4 may be retracted at a constant or substantially constant low speed (that is, a speed substantially not to be decelerated) after the large speed reduction as shown by two dot chain line in FIG. 7. At this time, likewise, at a point of time when the rotation of the spool 9 in the seat belt retracting direction is finished since the retracting of the seat belt 4 is finished, it is needless to say that the inertia body of the locking mechanism 12 has already been at the non-lock position as described above.

According to the seat belt retractor 3 in the first embodiment, when the seat belt winding diameter of the spool 9 reaches a predetermined winding diameter in the vicinity of a full or substantially full amount of the seat belt, the surface 4b of the seat belt 4 wound around the spool. 9 is first indirectly brought into contact with the inclined portion 18b of the braking member 18 made of an elastic plate material in the end-lock preventing mechanism 14 through the braking roller 17. Therefore, by means of the large speed-reduction portion of the braking member 18 on the basis of the indirect contact of the surface 4b of the seat belt 4 with the inclined portion 18b, the seat belt retracting speed of the spool 9 can be largely reduced. Particularly, by realizing the large reduction of the retracting speed of the seat belt 4 by the wedge effect of the end-lock preventing mechanism 14, the retracting speed of the seat belt 4 can be largely reduced more effectively.

Subsequently, since the braking member 18 allows the seat belt retracting by the spool 9 at the largely-reduced low seat belt retracting speed, when the seat belt 4 is retracted at a low speed and the retracting of the seat belt 4 is finished, it becomes possible to bring the locking mechanism 12 to the non-lock position. As a result, by largely reducing the seat belt retracting speed, even if the inertia body of the locking mechanism 12 has been moved to the lock position once, occurrence of end lock at rotation stop of the spool 9 when the seat belt retracting by the spool 9 is finished can be prevented effectively.

Moreover, after the seat belt retracting speed has been largely reduced, during the seat belt retracting by the spool 9 at a low seat belt retracting speed by a low speed portion, by retracting the seat belt 4 while the seat belt retracting speed is reduced by a small amount, the rotation of the spool 9 in the seat belt retracting direction can be stopped more smoothly, and end lock can be prevented stably.

Also, by forming the braking member 18 of the end-lock preventing mechanism 14 by an elastic plate material, it can be configured that when rotation speed of the spool 9 is smoothly lowered and at least retracting of the seat belt 4 is finished after the rotation speed of the spool 9 is largely reduced, the inertia body of the locking mechanism 12 has been brought to the non-lock position. Thus, while increase in the number of components is suppressed and the structure of the end-lock preventing mechanism 14 is simplified, end lock can be prevented.

Also, since the braking member 18 of the end-lock preventing mechanism 14 is integrally provided on the seat belt retractor 3, the braking member 18 can be positioned with higher accuracy with respect to the surface of the seat belt 4 wound around the spool 9. Therefore, stable deceleration can be obtained in the seat belt retracting speed, and end lock can be prevented further effectively when the retracting of the seat belt 4 by the spool 9 is finished.

Moreover, when withdrawing of the seat belt 4 for wearing the seat belt 4 is started, the spool is rotated in a direction to release the wedge effect of the end-lock preventing mechanism 14, and a large seat belt withdrawing force is not required in the seat belt withdrawing operation by the occupant, and handling performance of the seat belt 4 by the occupant becomes favorable. Moreover, when the seat belt 4 has been withdrawn by a predetermined amount, the end-lock preventing mechanism 14 no longer acts on the seat belt 4, and the withdrawing force of the seat belt 4 can be made further small, and handling performance of the seat belt 4 by the occupant is made further favorable.

Moreover, since the end-lock preventing mechanism 14 does not act on the seat belt 4 when the seat belt 4 is worn, a sense of pressure of the seat belt 4 on the occupant by the end-lock preventing mechanism 14 can be prevented. In this way, according to the seat belt retractor 3 of this embodiment, such seat belt retractor 3 can be realized that the structure is further simplified, assembling can be further facilitated, and handling performance of the seat belt 4 by the occupant can be improved, while end lock can be prevented more effectively.

As an end-lock preventing member 14 of a variation of the first embodiment, the inclined portion 18b of the braking member 18 may be inclined in two stages, that is, a steep inclined portion 18d and a gentle inclined portion 18e as shown in FIG. 6D. By providing the steep inclined portion 18d and the gentle inclined portion 18e as above, end lock can be prevented smoothly. The other configurations and other working effects of this variation are substantially the same as the above-mentioned embodiment.

Also, as the end-lock preventing member 14 of another variation of the above-mentioned first embodiment, as shown in FIG. 6E, a braking roller support portion 18f may be provided continuously to the distal end of the inclined portion 18b of the braking member 18. This braking roller support portion 18f elastically and lightly supports the braking roller 17 in a state in which the seat belt 4 is withdrawn by a predetermined amount and the surface 4b of the seat belt 4 wound around the spool 9 is separated from the braking roller 17. In a state of the braking roller 17 shown in FIG. 6E, the rotation shaft 17a is separated from lower end edges $16d_1$, $16e_1$ of the guide holes 16d, 16e by the braking roller support portion 18f and is elastically and lightly brought into contact with upper end edges $16d_2$, $16e_2$ of the guide holes 16d, 16e. Each operation of large speed reduction and small speed reduction of this variation is the same as shown in FIGS. 6B and 6A. In this way, by elastically and lightly supporting the braking roller 17 by the braking roller support portion 18f, a behavior of the braking roller 17 can be made stable. The other configurations and the other working effects of this variation are substantially the same as the above-mentioned embodiment.

On the other hand, according to the seat belt device 1 provided with the seat belt retractor 3 of this embodiment, an assembling work of the end-lock preventing mechanism 14 is no longer needed when the seat belt device 1 is assembled to a vehicle, and the number of assembling processes of the seat belt device 1 can be reduced, and the assembling work of the seat belt device 1 to the vehicle is simplified. Also, since end lock in the seat belt retractor 3 can be prevented more effectively and handling performance of the seat belt 4 by the occupant can be improved, operability of the seat belt 4 is improved and a wearing operation of the seat belt 4 by the occupant can be performed smoothly and stably.

Figure 9A:
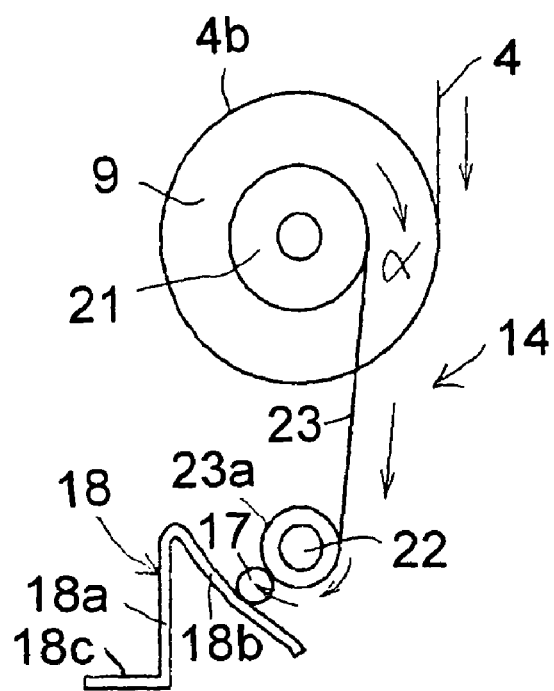
FIGS. 9A and 9B are diagrams schematically and partially illustrating a second embodiment of the embodiment of the seat belt retractor according to the present invention.
Figure 9B:
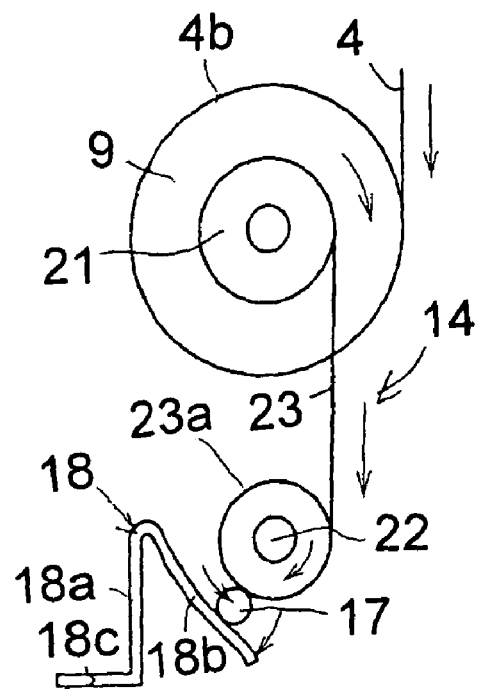

FIGS. 9A and 9B are diagrams schematically and partially illustrating a second embodiment of an embodiment of the seat belt retractor according to the present invention.

In the end-lock preventing mechanism 14 of the seat belt retractor 3 of the above-mentioned first embodiment, the surface 4b of the seat belt 4 wound around the spool 9 is indirectly brought into contact with the inclined portion 18b of the braking member 18 through the braking roller 17. On the other hand, in the end-lock preventing mechanism 14 of the seat belt retractor 3 of the second embodiment, a surface of a flat spiral spring whose winding diameter is changed according to a retracted amount of the seat belt 4 is brought into contact with the inclined portion 18b of the braking member 18 through the braking roller 17.

That is, as shown in FIGS. 9A and 9B, the end-lock preventing mechanism 14 of the seat belt retractor 3 of the second embodiment is provided with a spool-side retracting roller 21 coaxially with the spool 9 and capable of integral rotation with the spool 9, a frame-side retracting roller 22 rotatably provided on the end-lock preventing frame 16, and a flat spiral spring 23 extended between the spool-side retracting roller 21 and the frame-side retracting roller 22. In this case, the flat spiral spring 23 is provided so as to urge the frame-side retracting roller 22 in a direction that the flat spiral spring 23 is retracted by the frame-side retracting roller 22, that is, a direction of retracting the seat belt 4 by the spool 9.

In the seat belt retractor 3 of this second embodiment, in a state in which the seat belt 4 is withdrawn from the seat belt retractor 3 by a predetermined amount for wearing of the seat belt 4, the flat spiral spring 23 is retracted on the side of the spool-side retracting roller 21, and a retracting diameter of the flat spiral spring 23 at the frame-side retracting roller 22 is small. Therefore, a surface 23a of the flat spiral spring wound around the frame-side retracting roller 22 is not brought into contact with the inclined portion 18b of the braking member 18 through the braking roller 17.

Upon release of the seat belt 4, when the spool 9 is rotated in the seat belt retracting direction α and retracts the seat belt 4, the spool-side retracting roller 21 is also rotated in the seat belt retracting direction α. Then, the retracting diameter of the flat spiral spring 23 retracted by the frame-side retracting roller 22 is increased. When the retracted amount of the seat belt 4 reaches the vicinity of a substantially full-amount retracting, as shown in FIG. 9A, the surface 23a of the flat spiral spring 23 is brought into contact with the inclined portion 18b of the braking member 18 through the braking roller 17 similarly to the above-mentioned first embodiment. Then, similarly to the above-mentioned first embodiment, the braking roller 17 is effectively braked by the wedge effect between the surface 23a of the flat spiral spring and the inclined portion 18b, and rotation speed of the frame-side retracting roller 22 is largely reduced. Therefore, the spool 9 has its rotation speed largely reduced and retracts the seat belt 4 (retracting with large speed reduction).

Then, as shown in FIG. 9B, while the inclined portion 18b is elastically deformed after large speed reduction, the seat belt 4 is retracted by the spool 9 at a low seat belt retracting speed (retracting with small speed reduction), and thus, similarly to the above-mentioned first embodiment, when the seat belt 4 is retracted by a full amount or a substantially full amount and rotation of the spool 9 is stopped, end lock is prevented.

In FIGS. 9A and 9B, the guide holes 16d, 16e are not shown. Also, the other configurations and the other working effects of the seat belt retractor 3 of the second embodiment are the same as the above-mentioned first embodiment.

Figure 10A:
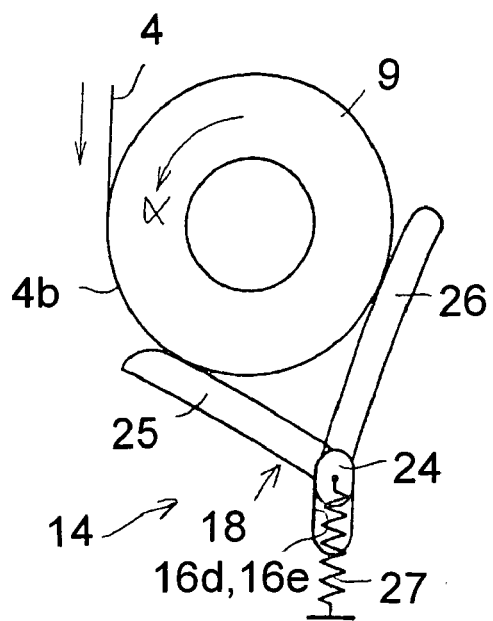
FIGS. 10A and 10B are diagrams schematically and partially illustrating a third embodiment of the embodiment of the seat belt retractor according to the present invention.
Figure 10B:
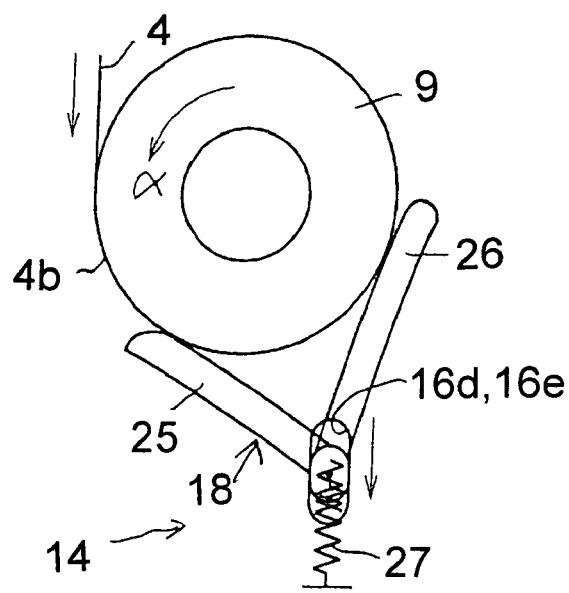

FIGS. 10A and 10B are diagrams schematically and partially illustrating a third embodiment of an embodiment of a seat belt retractor according to the present invention.

In the end-lock preventing mechanism 14 of the seat belt retractor 3 of the above-mentioned first embodiment, the braking member 18 to which the surface 4b of the seat belt 4 wound around the spool 9 is constructed by an elastic material. On the other hand, in the end-lock preventing mechanism 14 of the seat belt retractor 3 of this third embodiment, the braking member 18 is not constructed by an elastic material.

That is, as shown in FIGS. 10A and 10B, the braking member of the end-lock preventing mechanism 14 in the seat belt retractor 3 of the third embodiment has a guide member 24 guided not capable of rotation but vertically movably by vertically linear guide holes 16d, 16e drilled in the right and left side walls 16b, 16c of the end-lock preventing frame 16, first arm 25 and second arm 26 connected to the guide member 24 in the V-shape state with a predetermined opened angle smaller than 180 degrees, and a guide-member urging spring 27 for urging the guide member 24 upward, that is, in a direction of the spool 9, all the time.

In the seat belt retractor 3 of this third embodiment, in a state in which the seat belt 4 has been withdrawn from the seat belt retractor 3 by a predetermined amount for wearing of the seat belt 4, the surface 4b of the seat belt 4 retracted by the spool 4 is separated from either of the first arm 25 and the second arm 26. Therefore, the guide member 24, the first arm 25, and the second arm 26 are set at the highest position.

Upon release of the seat belt 4, when the spool 9 is rotated in the seat belt retracting direction α and retracts the seat belt 4, the retracting diameter of the seat belt 4 retracted by the spool 9 is increased. When the retracted amount of the seat belt 4 reaches the vicinity of a substantially full-amount retracting, as shown in FIG. 10A, the surface 4b of the seat belt 4 is brought into contact with the first and second arms 25, 26 of the braking member 18.

That is, the surface 4b of the seat belt 4 wound around the spool 9 is brought into contact in the wedge state with the first and second arms 25, 26. Then, the spool 9 has its seat belt retracting speed largely reduced by the wedge effect of the first and second arms 25, 26 and retracts the seat belt 4 (retracting with large speed reduction).

Then, as shown in FIG. 10B, as the retracting diameter of the seat belt 4 is increased by further retracting of the seat belt 4, the guide member 24 is slowly moved downward against the urging force of the guide-member urging spring 27. As a result, the spool 9 retracts the seat belt 4 while its largely-reduced seat belt retracting speed is reduced by a small amount (retracting with small speed reduction). After that, the spool 9 retracts the full amount of the seat belt 4 and stops rotation.

Therefore, similarly to the above-mentioned first embodiment, when the seat belt 4 is retracted by a full or a substantially full amount and rotation of the spool 9 is stopped, end lock is prevented.

The other configurations and the other working effects of the seat belt retractor 3 of the third embodiment are the same as the above-mentioned first embodiment.

Figure 11A:
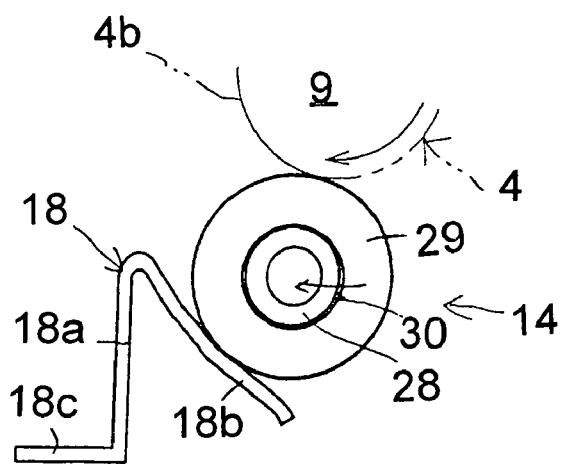
FIGS. 11A and 11B are diagrams schematically and partially illustrating a fourth embodiment of the embodiment of the seat belt retractor according to the present invention.
Figure 11B:
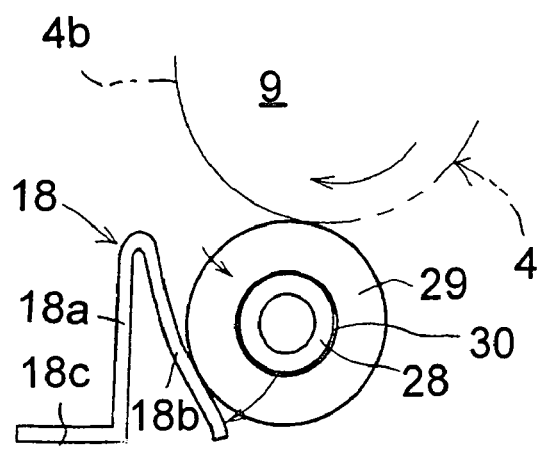

FIGS. 11A and 11B are diagrams schematically and partially illustrating a fourth embodiment of a seat belt retractor according to the present invention.

In the end-lock preventing mechanism 14 of the seat belt retractor 3 of the above-mentioned first embodiment, the braking roller 17 is in a single structure. On the other hand, in the end-lock preventing mechanism 14 of the seat belt retractor 3 in the fourth embodiment, the braking roller 17 is in a double structure.

That is, as shown in FIGS. 11A and 11B, the end-lock preventing mechanism 14 of the seat belt retractor 3 in the fourth embodiment has a relatively hard small-diameter first roller 28, a second roller 29 made of a rubber roller, externally fitted to the first roller 28 and having relatively softer elasticity, and the same braking member 18 as that of the first embodiment. In this case, a micro gap 30 is formed between an outer peripheral face of the first roller 28 and an outer peripheral face of the second roller 29.

In the seat belt retractor 3 of this fourth embodiment, in a state in which the seat belt 4 has been withdrawn from the seat belt retractor 3 by a predetermined amount for wearing of the seat belt 4, the surface 4b of the seat belt 4 wound around the spool 9 is not brought into contact with the second roller 29.

Upon release of the seat belt 4, the spool 9 is rotated in the seat belt retracting direction α and retracts the seat belt 4. Then, the retracting diameter of the seat belt 4 retracted by the spool 9 is increased. If the retracting diameter of the seat belt 4 retracted by the spool 9 is further increased, the surface 4b of the seat belt 4 is brought into contact with the second roller 29. Moreover, as the seat belt 4 is retracted by the spool 9 and the retracting diameter of the seat belt 4 is increased, the second roller 29 is elastically deformed and brought into contact with the first roller 28, and the first and second rollers 28, 29 are guided by the guide holes 16d, 16e and axially moved. When the retracted amount of the seat belt 4 reaches the vicinity of a substantially full amount retracting, as shown in FIG. 11A, the second roller 29 is brought into contact with the inclined portion 18b of the braking member 18. Then, the spool 9 has the seat belt retracting speed largely reduced by the wedge effect between the surface 4b of the seat belt 4 retracted by the spool 9 and the inclined portion 18b and retracts the seat belt 4 (retracting with large speed reduction).

After that, similarly to the above-mentioned first embodiment, as the retracting diameter of the seat belt 4 is increased by further retracting of the seat belt 4, the inclined portion 18b of the braking member 18 is elastically deformed as shown in FIG. 11B. As a result, the spool 9 retracts the seat belt 4 while its largely reduced seat belt retracting speed reduced by a small amount (retracting with small speed reduction). After that, the spool 9 retracts the full amount of the seat belt 4 and stops rotation.

Therefore, similarly to the above-mentioned first embodiment, when the seat belt 4 has been retracted by a full or a substantially full amount and rotation of the spool 9 is stopped, end lock is prevented.

The other configurations and the other working effects of the fourth embodiment are the same as the above-mentioned first embodiment.

Figure 12C:
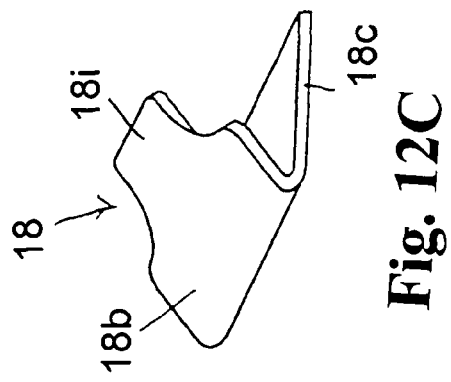
FIGS. 12A to 12C are diagrams schematically and partially illustrating a braking member in fifth to seventh embodiments of the seat belt retractor according to the present invention.
Figure 12B:
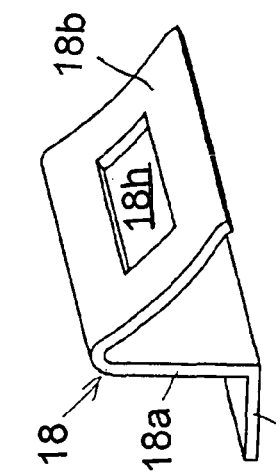
Figure 12A:
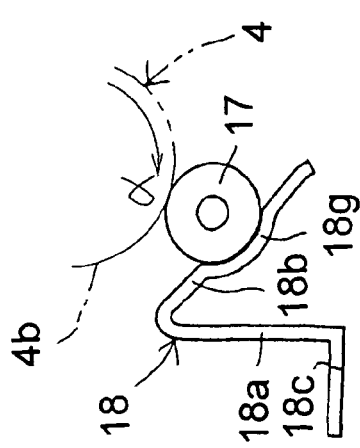
Figure 12D:
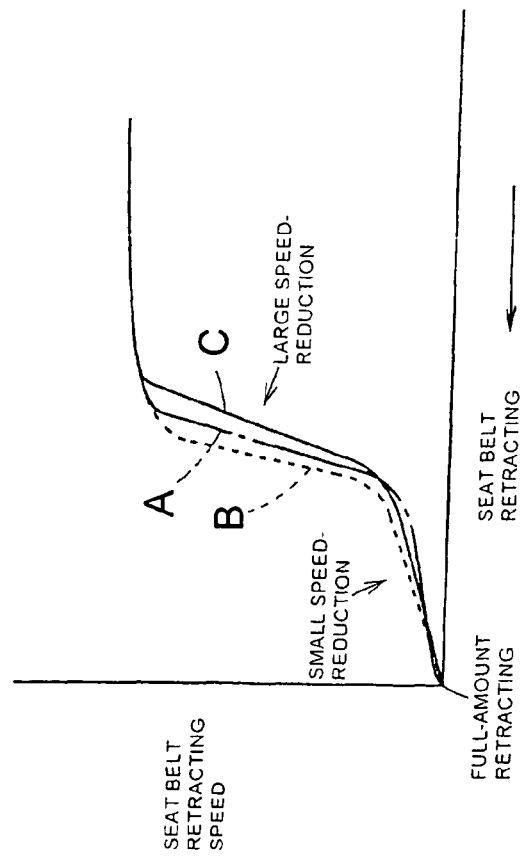
FIG. 12D is a diagram illustrating seat belt retracting speeds of these embodiments.

FIGS. 12A to 12C are diagrams schematically and partially illustrating a braking member of fifth to seventh embodiments of an embodiment of a seat belt retractor according to the present invention, and FIG. 12D is a diagram illustrating seat belt retracting speeds of these embodiments.

The braking member 18 of the fifth embodiment shown in FIG. FIG. 12A has a holding portion 18g provided at the inclined portion 18b and holding the braking roller 17. The holding portion 18g is formed in an arc state with substantially the same diameter as the outer diameter of the braking roller 17. It is needless to say that the holding portion 18g is not necessarily limited to an arc. According to the fifth embodiment, since the braking roller 17 is held by the holding portion 18g, large speed reduction and small speed reduction can be obtained more effectively. That is, large speed reduction and small speed reduction characteristics of the seat belt retracting speed can be obtained as indicated by a one-dot chain line in FIG. 12D.

The braking member 18 of the sixth embodiment shown in FIG. 12B has an opening 18h provided in the inclined portion 18b. By varying size setting of this opening 18h, a spring characteristic of the braking member 18 can be changed. As a result, braking performance of the braking member 18 can be set to more desirable performance. In this sixth embodiment, large speed reduction and small speed reduction characteristics of the seat belt retracting speed as shown by a dot line in FIG. 12D can be obtained.

The braking member 18 in the seventh embodiment shown in FIG. 12C does not have the vertical portion 18a, and the inclined portion 18b is directly provided on the mounting portion 18c. This inclined portion 18b has a narrow width portion 18i in which a width on the distal end side of the inclined portion 18b is set narrower than the width on the mounting portion 18c side of the inclined portion 18b. By varying the size setting of the width of the inclined portion 18b, spring characteristic of the braking member 18 can be changed. As a result, braking performance of the braking member can be set to more desirable performance. In the seventh embodiment, large speed reduction and small speed reduction characteristics of the seat belt retracting speed as shown by a solid line in FIG. 12D can be obtained.

The other configurations and the other working effects of the seat belt retractor 3 of the fifth to seventh embodiments are the same as the above embodiment.

Also, by selecting thickness, material and the like of the braking member 18 as appropriate, the spring characteristic of the braking member 18 can be changed, and similarly, the braking performance of the braking member 18 can be set to more desirable performance.

The seat belt retractor of the present invention is not limited to the above-mentioned embodiments but can be changed in various ways. For example, in the seat belt retractor 3 in the first, second and fourth embodiments, the surface 4b of the seat belt 4 retracted by the spool 9 or the surface 23a of the flat spiral spring 23 wound around the frame-side retracting roller 22 is indirectly brought into contact with the braking member 18 through the rollers 17, 28, 29 and the like, but similarly to the seat belt retractor 3 in the third embodiment, the surface 4b of the seat belt 4 retracted by the spool 9 or the surface 23a of the flat spiral spring 23 wound around the frame-side retracting roller 22 can be directly brought into contact with the braking member 18.

Also, the seat belt retractor of the present invention can be also applied to a seat belt retractor having a possibility that end lock might occur due to members of the locking mechanism other than the inertia body in addition to the end lock by the inertia body of the locking mechanism as in the above-mentioned embodiment when the seat belt 4 has been retracted by a full or substantially full amount and rotation of the spool 9 is stopped.

Moreover, the seat belt retractor of the present invention is not limited to a seat belt retractor having an ELR function in the above-mentioned embodiments but can be also applied to a seat belt retractor having an ALR function.

In short, the present invention can be designed in various ways in a range of matters described in claims.

The seat belt retractor and the seat belt device of the present invention can be suitably used in a seat belt retractor having a possibility of occurrence of end lock and a seat belt device using this seat belt retractor.

The disclosure of Japanese Patent Application No. 2008-296323 filed on Nov. 20, 2008, is incorporated as a reference herein.

While the invention has been explained with reference to the specific embodiments of the invention, the explanation is illustrative, and the invention is limited only by the appended claims.

What is claimed is:

1. A seat belt retractor for retracting a seat belt, comprising:
a spool for retracting the seat belt,
a locking mechanism for locking rotation of said spool, and
an end-lock preventing mechanism for preventing an end-lock of the seat belt, said end-lock preventing mechanism including a first speed-reduction portion for reducing a seat belt retracting speed of said spool when the spool retracts a substantially full length of the seat belt, and a second speed-reduction portion for reducing the seat belt retracting speed less than that of the first speed-reduction portion so as to provide a delay for said locking mechanism to be brought to a non-lock position at least when retraction of the seat belt is finished.

2. A seat belt retractor for retracting a seat belt, comprising:
a spool for retracting the seat belt,
a locking mechanism for locking rotation of said spool, and
an end-lock preventing mechanism for preventing an end-lock of the seat belt, said end-lock preventing mechanism including a braking member for directly or indirectly contacting a surface of the seat belt wound around the spool when the spool retracts a substantially full length of the seat belt,
wherein said braking member reduces a seat belt retracting speed of said spool to a first reduced seat belt retracting speed, and reduces the first reduced seat belt retracting speed to a second reduced seat belt retraction speed less than the first reduced seat belt retracting speed so as to provide a delay for said locking mechanism to be brought to a non-lock position at least when the full length of the seat belt is retracted.

3. The seat belt retractor according to claim 2, wherein the end-lock preventing mechanism further includes an end-lock preventing frame having two side walls, and a braking roller rotatably and movably attached on the two side walls and contacting the seat belt wound on the spool, the braking member contacting the braking roller.

4. The seat belt retractor according to claim 3, wherein the two side walls of the end-lock preventing frame include two guide holes, each having a horizontal portion and an inclined portion so that the braking roller moves along the guide holes according to a size of the seat belt wound on the spool.

5. The seat belt retractor according to claim 4, wherein the braking member includes an inclined portion contacting the braking roller when the seat belt is wound on the spool, to thereby reduce a rotational speed of the braking roller.

6. The seat belt retractor according to claim 2, wherein said braking member comprises a first speed-reduction portion for reducing the seat belt retracting speed to the first reduced seat belt retracting speed when the brake member directly or indirectly contacts the surface of the seat belt wound around said spool in a wedge state, and a second speed-reduction portion for reducing the first reduced seat belt retracting speed to the second reduced seat belt retraction speed.

7. The seat belt retractor according to claim 6, wherein said first speed-reduction portion and said second speed-reduction portion are formed of an elastic plate material.

8. The seat belt retractor according to claim 6, wherein said braking member comprises two arms connected to each other to form a predetermined open angle smaller than 180 degrees, and the first speed-reduction portion largely reduces the seat belt retracting speed when the surface of the seat belt wound around the spool contacts the two arms directly or indirectly in the wedge state.

9. The seat belt retractor according to claim 6, wherein the braking member comprises a vertical portion and an inclined portion downwardly extending from the vertical portion so as to form a V-shape in a cross section, and the inclined portion directly or indirectly contacts the surface of the seat belt wound around said spool in the wedge state.

10. The seat belt retractor according to claim 9, further comprising a braking roller rotatably provided between the inclined portion of the braking member and the surface of the seat belt wound around said spool so as to contact the surface of the seat belt wound around said spool, wherein a rotation axis of the braking roller is movable so as to come closer or away from the inclined portion of the braking member.

11. The seat belt retractor according to claim 1, wherein said second speed-reduction portion adjusts a deceleration of the seat belt retracting speed to be lower than that at the first speed-reduction portion.

12. A seat belt device for restraining an occupant, comprising:
the seat belt for restraining the occupant,
the seat belt retractor according to claim 1,
a tongue slidably supported by said seat belt withdrawn from said seat belt retractor, and
a buckle provided on a vehicle body or a vehicle seat for detachably engaging said tongue.

* * * * *